United States Patent
Fan et al.

(10) Patent No.: US 7,874,140 B2
(45) Date of Patent: Jan. 25, 2011

(54) METHOD OF AND POWER PLANT FOR GENERATING POWER BY OXYFUEL COMBUSTION

(75) Inventors: Zhen Fan, Parsippany, NJ (US);
Andrew Seltzer, Livingston, NJ (US);
Horst Hack, Lebanon, NJ (US)

(73) Assignee: Foster Wheeler North America Corp., Clinton, NJ (US)

( * ) Notice: Subject to any disclaimer, the term of this patent is extended or adjusted under 35 U.S.C. 154(b) by 858 days.

(21) Appl. No.: 11/760,280

(22) Filed: Jun. 8, 2007

(65) Prior Publication Data
US 2008/0302107 A1    Dec. 11, 2008

(51) Int. Cl.
*F02C 7/10* (2006.01)
*F02G 1/00* (2006.01)

(52) U.S. Cl. .................. 60/39.511; 60/39.52; 122/7 R; 110/233

(58) Field of Classification Search .............. 60/649, 60/39.511, 320, 39.182, 783, 39.52, 39.461; 110/233, 345; 122/7 R
See application file for complete search history.

(56) References Cited

U.S. PATENT DOCUMENTS 4,099,383 A    7/1978    Paull et al. .................. 60/648

(Continued)

FOREIGN PATENT DOCUMENTS

EP    0 561 065 A1    9/1993

(Continued)

OTHER PUBLICATIONS

Written Opinion of the International Searching Authority mailed Oct. 7, 2009, issued in corresponding International Application No. PCT/IB2008/052155.

(Continued)

*Primary Examiner*—William H Rodriguez
(74) *Attorney, Agent, or Firm*—Fitzpatrick, Cella, Harper & Scinto (57) ABSTRACT

A method of and a power plant for generating power by combusting carbonaceous fuel with substantially pure oxygen, and a method of modifying a process of generating power by combusting carbonaceous fuel from combusting the fuel with air to combusting the fuel with substantially pure oxygen. The methods include feeding substantially pure oxygen into a furnace for combusting fuel with the oxygen to produce exhaust gas including mainly carbon dioxide and water, recovering low-grade heat from the exhaust gas by using multiple exhaust gas coolers arranged in a downstream portion of the exhaust gas channel, wherein a first portion of the recovered low-grade heat is used for preheating feedwater; pressurizing a first portion of the exhaust gas in multiple exhaust gas compressors so as to produce liquid carbon dioxide, recycling a second portion of the exhaust gas to the furnace via an exhaust gas recycling channel, using a first portion of steam extracted from a steam turbine system to preheat feedwater, wherein the first portion of the recovered low-grade heat is more than 50% of the total amount of recovered low-grade heat, or larger than the first portion of the recovered low-grade heat in the air-fired process, allowing minimizing of the first portion of the extracted steam, and the expanding of a second portion of the extracted steam in at least one auxiliary steam turbine for driving at least one compressor or at least one pump of the power plant.

56 Claims, 1 Drawing Sheet

U.S. PATENT DOCUMENTS

| | | | | |
|---|---|---|---|---|
| 4,205,630 | A | 6/1980 | Regan | 122/1 R |
| 4,430,962 | A | 2/1984 | Miszak | 122/406.5 |
| 5,296,206 | A * | 3/1994 | Cho et al. | 423/235 |
| 5,344,627 | A | 9/1994 | Fujii et al. | 423/220 |
| 6,202,574 | B1 | 3/2001 | Liljedahl et al. | 110/233 |
| 6,883,327 | B2 | 4/2005 | Iijima et al. | 60/649 |
| 6,935,251 | B2 | 8/2005 | Marin et al. | 110/204 |
| 7,559,977 | B2 * | 7/2009 | Fleischer et al. | 95/236 |
| 2006/0248890 | A1* | 11/2006 | Iijima et al. | 60/645 |
| 2008/0141672 | A1* | 6/2008 | Shah et al. | 60/648 |
| 2008/0184880 | A1* | 8/2008 | Fan et al. | 95/40 |
| 2009/0158978 | A1* | 6/2009 | Seltzer et al. | 110/345 |
| 2009/0260585 | A1* | 10/2009 | Hack et al. | 122/7 R |
| 2009/0293782 | A1* | 12/2009 | Eriksson et al. | 110/205 |
| 2009/0297993 | A1* | 12/2009 | Fan et al. | 431/4 |
| 2010/0071380 | A1* | 3/2010 | Buecker et al. | 60/772 |
| 2010/0077947 | A1* | 4/2010 | Hack | 110/345 |

FOREIGN PATENT DOCUMENTS

| | | | |
|---|---|---|---|
| WO | WO 2005/045316 | A2 | 5/2005 |
| WO | WO 2006/131283 | A2 | 12/2006 |

OTHER PUBLICATIONS

International Search Report dated Oct. 1, 2009, which issued in corresponding International Application No. PCT/IB2008/052155.

Andersson, K., et al. "Large Scale $CO_2$ Capture—Applying the Concept of $O_2/CO_2$ Combustion to Commercial Process Data," VGB Powertech, vol. 83, No. 10, Jan. 1, 2003. pp. 29-33.

Hellfritsch, S., et al. "Concept for a Lignite-fired Power Plant Based on the Optimised Oxyfuel Process with $CO_2$ Recovery," VGB Powertech, vol. 84, No. 8, Jan. 1, 2004. pp. 76-82.

International Preliminary Report on Patentability dated Dec. 11, 2009, and mailed on Dec. 23, 2009, in corresponding International Application No. PCT/IB2008/052155.

* cited by examiner

Fig. 1

METHOD OF AND POWER PLANT FOR GENERATING POWER BY OXYFUEL COMBUSTION

BACKGROUND OF THE INVENTION

1. Field of the Invention

The present invention relates to a method of and a power plant for efficient oxyfuel combustion, and to a method of modifying a process of generating power by combusting carbonaceous fuel from combusting the fuel with air to combusting the fuel with substantially pure oxygen. More particularly, the present invention relates to oxyfuel combustion including carbon dioxide removal, wherein the costs or losses of produced power due to the carbon dioxide removal are minimized.

2. Description of the Related Art

Oxyfuel combustion is one of the methods suggested for removing $CO_2$ from the combustion gases of a power generating boiler, such as a pulverized coal (PC) boiler or circulating fluidized bed (CFB) boiler. Oxyfuel combustion is based on combusting carbonaceous fuel with substantially pure oxygen, typically of about 95% purity, so as to have carbon dioxide and water as the main components of the exhaust gas discharged from the boiler. Thereby, the carbon dioxide can be captured relatively easily, without having to separate it from a gas stream having nitrogen as its main component, as when combusting the fuel with air.

Oxyfuel combustion is more complicated than conventional combustion because of the need of an oxygen supply, typically, a cryogenic air separation unit (ASU), where air is cooled and compressed so that oxygen can be separated from other components of air, mainly, nitrogen. $CO_2$ can be separated from the exhaust gas, for example, by cooling it to a relatively low temperature and by compressing it to a high pressure, typically, greater than 110 bar. Both the production of oxygen and the compression/purification of carbon dioxide increase the total production costs of the power generation process, for example, by decreasing the net power produced in the process.

The steam cycle of a utility boiler comprises a number of heating stages, wherein low temperature feedwater obtained from a condenser is converted to high temperature steam, which will be conducted to a high pressure steam turbine. The process of heating the feedwater comprises the stages of preheating, evaporating and superheating. Normally, the feedwater preheating consists of heating with steam, which is extracted from the steam turbines, and final preheating in one or more economizers arranged in the downstream portion of the exhaust gas channel. An example of a conventional steam cycle of a utility boiler is shown is U.S. Pat. No. 4,430,962.

Evaporative heat exchange surfaces are usually arranged as waterwalls of the furnace, and superheating surfaces, and possible reheating surfaces, are most often arranged in the upstream portion of the exhaust gas channel. In order to increase thermal efficiency of the boiler, in the downstream portion of the exhaust gas channel is usually arranged an air heater downstream of the economizer, wherein the exhaust gas will be cooled to a final temperature, which is typically from 150° C. to 120° C. An example of a utility boiler with an air heater is shown in U.S. Pat. No. 4,205,630.

U.S. Pat. No. 6,202,574 suggests a combustion unit for firing fossil fuel with substantially pure oxygen to produce exhaust gas having carbon dioxide and water as its two largest constituents. A portion of the exhaust gas is recycled to the combustion unit and the rest of the exhaust gas is compressed and stripped to produce carbon dioxide in a liquid phase. The recycled exhaust gas and the substantially pure oxygen stream are preheated by the exhaust gas in respective gas-gas heat exchangers.

U.S. Pat. No. 6,935,251 suggests a method of combusting fuel with an oxidant stream comprising an oxygen enriched gas stream, having an oxygen content from 21% to 100%, mixed with flue gas, so as to generate flue gas having a mass flow rate which is smaller than the mass flow rate of flue gas generated by using air as the oxidant stream, whereby the size of the flue gas pollution control system can be minimized.

U.S. Pat. Nos. 5,344,627 and 6,883,327 each describes a conventional steam-generating process, where $CO_2$ is removed from the exhaust gas through absorption by a solvent, wherein a portion of outlet steam from high pressure or intermediate pressure steam turbines is expanded in auxiliary turbines to drive a carbon dioxide compressor and auxiliary machinery. These processes can be used to minimize, to some extent, the costs or the decreasing of the net power produced in the process.

SUMMARY OF THE INVENTION

An object of the present invention is to provide a method of and a power plant for oxyfuel combustion, wherein the costs or losses of produced power due to carbon dioxide removal are minimized.

Another object of the present invention is to provide a method of modifying a process of generating power by combusting carbonaceous fuel from air-combustion to oxygen-combustion including carbon dioxide removal, wherein the total costs or losses are minimized.

According to an aspect of the present invention, a method of generating power by combusting carbonaceous fuel with substantially pure oxygen is provided, the method comprising the steps of: (a) feeding carbonaceous fuel into a furnace; (b) feeding substantially pure oxygen from an oxygen supply into the furnace for combusting the fuel with the oxygen to produce exhaust gas comprising mainly carbon dioxide and water; (c) discharging the exhaust gas via an exhaust gas channel from the furnace; (d) recovering a total amount of low-grade heat from the exhaust gas by using multiple exhaust gas coolers arranged in a downstream portion of the exhaust gas channel, wherein a first portion of the recovered low-grade heat is used for preheating feedwater; (e) converting preheated feedwater to steam by recovering high-grade heat in heat exchange surfaces arranged in the furnace and in an upstream portion of the exhaust gas channel; (f) pressurizing a first portion of the exhaust gas in multiple exhaust gas compressors so as to produce liquid carbon dioxide; (g) recycling a second portion of the exhaust gas to the furnace via an exhaust gas recycling channel; (h) expanding the steam in a steam turbine system for driving a power generator; (i) extracting a total amount of steam from the steam turbine system, and using a first portion of the extracted steam to preheat feedwater, wherein the first portion of the recovered low-grade heat is more than 50% of the total amount of recovered low-grade heat allowing minimizing of the first portion of the extracted steam, and the method comprising a further step of: (j) expanding a second portion of the extracted steam in at least one auxiliary steam turbine for driving at least one compressor or at least one pump of the power plant.

According to another aspect of the present invention, a power plant for generating power by combusting carbonaceous fuel with substantially pure oxygen is provided, the power plant comprising: a furnace for combusting the fuel; an oxygen channel connected to the furnace for feeding the substantially pure oxygen from an oxygen supply to the furnace for combusting the fuel with the oxygen to produce exhaust gas comprising mainly carbon dioxide and water; an exhaust gas channel connected to the furnace for discharging the exhaust gas from the furnace; a steam cycle for converting feedwater to steam, comprising an economizer system for preheating the feedwater and heat exchange surfaces arranged in the furnace and in an upstream portion of the exhaust gas channel for recovering high-grade heat to convert preheated feedwater to steam; multiple exhaust gas coolers arranged in a downstream portion of the exhaust gas channel for recovering a total amount of low-grade heat from the exhaust gas, wherein a portion of the exhaust gas coolers forms the economizer system; multiple exhaust gas compressors for pressurizing a first portion of the exhaust gas so as to produce liquid carbon dioxide; an exhaust gas recycling channel for recycling a second portion of the exhaust gas to the furnace; a steam turbine system for expanding the steam to drive a power generator, the steam turbine system comprising means for extracting a total amount of steam; means for using a first portion of the extracted steam to preheat feedwater, wherein the economizer system is designed for recovering therein, in normal operation conditions, more than 50% of the total amount of low-grade heat to be recovered by the gas coolers, allowing minimizing of the first portion of the extracted steam, and the power plant further comprising: at least one auxiliary steam turbine for expanding a second portion of the extracted steam to drive at least one compressor or at least one pump of the power plant.

According to a third aspect of the present invention, a method of modifying a process of generating power by combusting carbonaceous fuel from combusting the fuel with air to combusting the fuel with substantially pure oxygen is provided, wherein the original process comprises the steps of: (a) feeding carbonaceous fuel into a furnace at a first fuel feeding rate; (b) feeding air at a specific inlet air temperature into the furnace for combusting the fuel with the air to produce exhaust gas at a first temperature range; (c) discharging the exhaust gas from the furnace via an exhaust gas channel; (d) recovering a first total amount of low-grade heat from the exhaust gas in exhaust gas coolers arranged in a downstream portion of the exhaust gas channel, wherein a first portion of the first total amount of low grade heat is used for preheating feedwater; (e) converting preheated feedwater to steam by recovering high-grade heat in heat exchange surfaces arranged in the furnace and in an upstream portion of the exhaust gas channel, and (f) expanding the steam in a steam turbine system for driving a power generator, and extracting steam from the steam turbine system, wherein at least a portion of the extracted steam is used for preheating feedwater, to a modified process comprising the steps of: (a') feeding carbonaceous fuel into the furnace at a second fuel feeding rate; (b') feeding substantially pure oxygen from an oxygen supply into the furnace at an oxygen feeding rate for combusting the fuel with the oxygen to produce exhaust gas, comprising mainly carbon dioxide and water, at a second temperature; (c') discharging the exhaust gas from the furnace via the exhaust gas channel; (d') recovering a second total amount of low-grade heat from the exhaust gas in a modified set of exhaust gas coolers arranged in the downstream portion of the exhaust gas channel, wherein a first portion of the second total amount of low grade heat is used for preheating feedwater; (e') converting preheated feedwater to steam by recovering high-grade heat in the heat exchange surfaces arranged in the furnace and in the upstream portion of the exhaust gas channel; (f') pressurizing a portion of the exhaust gas in multiple exhaust gas compressors so as to produce liquid carbon dioxide; (g') recycling another portion of the exhaust gas to the furnace via an exhaust gas recycling channel; (h') expanding the steam in a steam turbine system for driving a generator; (i') extracting a total amount of steam from the steam turbine system and using a first portion of the extracted steam to preheat feedwater, wherein the first portion of the second total amount of low-grade heat is larger than the first portion of the first total amount of low-grade heat, allowing minimizing of the first portion of the extracted steam, and the method comprising a further step of: (j') expanding a second portion of the extracted steam in at least one auxiliary steam turbine for driving at least one compressor or at least one pump of the power plant.

In the following, the heat which is recovered in the combustion process at high temperatures by evaporative, superheating or reheating surfaces is called high-grade heat, and the heat which is recovered from the exhaust gas at lower temperatures, by economizers or one or more gas-gas heat exchangers, is called low-grade heat.

In conventional utility boilers, most of the feedwater preheating, typically, more than 70% of the preheating, is usually carried out by using steam extracted from the steam turbines, and, correspondingly, the share of the preheating by low-grade heat of the exhaust gas, by the economizers, is much lower, typically less than 30%. Due to the relatively small use of the economizers, most of the low-grade heat of the exhaust gas is usually recovered from the exhaust gas in one or more regenerative or recuperative inlet gas heaters. Correspondingly, the portion of the low-grade heat which is recovered in the economizers, a so-called first portion of the low-grade heat, is usually less than 50% of the total amount of recovered low-grade heat.

According to the present invention, the first portion of the recovered low-grade heat is higher than that in conventional boilers, preferably, more than 50%, even more preferably, more than 80%, of the total amount of recovered low-grade heat. These high heat recovery rates are advantageously obtained by arranging additional economizer surfaces in the downstream portion of the exhaust gas channel. Thereby, the last economizer surface is advantageously arranged in the exhaust gas channel in a location, where the exhaust gas temperature is preferably lower than 200° C., even more preferably, lower than 100° C. According to an advantageous embodiment of the present invention, at least one economizer surface is used as an inner-stage cooler between two exhaust gas compressors.

The use of extended economizer surfaces increases the share of the feedwater heating carried out by the economizers, and correspondingly, the need for feedwater heating by extracted steam is decreased. Advantageously, less than 50% of the feedwater heating is provided by the extracted steam. Correspondingly, a relatively large other portion, preferably, more than 50%, of the extracted steam, a so-called second portion of the extracted steam, can be used for other purposes. According to the present invention, the second portion of the extracted steam is expanded in at least one auxiliary steam turbine for driving at least one compressor or at least one pump of the power plant.

According to the earlier suggested designs for an oxyfuel boiler, the net power produced by the boiler is considerably decreased due to the auxiliary power required to produce substantially pure oxygen and to sequestrate carbon dioxide as compressed to a liquid. According to an advantageous embodiment of the present invention, at least a portion of the exhaust gas compressors is directly driven by mechanical energy of one of the auxiliary steam turbines. Thus, the need for auxiliary power for the compression of carbon dioxide is minimized. In a case in which the oxygen supply comprises a cryogenic air separation unit (ASU) having compressors for pressurizing air, one or more of these compressors can also be driven directly by the auxiliary steam turbines, so as to further decrease the need for auxiliary power.

An immediate consequence of recovering a relatively large portion of the low-grade heat in economizer surfaces is that a relatively small portion of the low-grade heat can be recovered in gas-gas heat exchangers arranged in the downstream portion of the exhaust gas channel. According to a preferred embodiment of the present invention, the power plant does not contain any gas-gas heat exchanger to transfer heat from the exhaust gas to the recycled exhaust gas or to the stream of substantially pure oxygen. Alternatively, the power plant may comprise a gas-gas heat exchanger transferring heat from the exhaust gas to the recycled exhaust gas or to a mixture of the recycled exhaust gas and the stream of substantially pure oxygen, but the efficiency of the gas-gas heat exchanger is clearly less than that of a typical air heater of a conventional utility boiler.

According to the present invention, the inlet gases can comprise separate streams of recycled exhaust gas and relatively pure oxygen, having typically a purity of 95% or higher, fed to the furnace. However, according to an advantageous embodiment of the present invention, the inlet gas stream is a combined stream of recycled exhaust gas and substantially pure oxygen. Because the power plant does not comprise any gas-gas heat exchangers for transferring heat from the exhaust gas to the inlet gas of the furnace, or the efficiency of such heat exchangers is low, the temperature of the inlet gas remains relatively low. The temperature of the inlet gas, when being fed to the furnace, is, according to the present invention, preferably lower than 200° C., even more preferably, lower than 100° C. This is clearly lower than in conventional utility boilers, where the temperature of the inlet gas is usually from 250 to 400° C., typically about 300° C.

The feeding rate of the relatively pure oxygen is determined on the basis of the fuel feeding rate, so as to provide sufficiently complete combustion of the fuel. Usually, the oxygen feeding rate is controlled by monitoring the content of residual oxygen in the exhaust gas, which should stay at a suitable level, typically about 3%.

Due to the high flow rate of the inlet gas, the heat content of the inlet gas has a considerable effect in the heat balance of the furnace. From the relatively low temperature of the inlet gas follows that a relatively large amount of fuel is to be fed to the furnace so as to obtain a desired temperature in the furnace. Especially when the present invention is used in retrofitting an air-fired boiler to an oxygen-combusting boiler, the fuel feeding rate is preferably increased by at least 10%, even more preferably, by at least 15%. Thereby, by using an oxyfuel combustion process in accordance with the present invention, more fuel can be fired in the furnace than by using conventional air-firing.

The furnace temperature of a retrofitted boiler may advantageously be maintained about the same as that in the original air-fired boiler in order to maintain the original steam generation rate, and to avoid, e.g., corrosion or material strength problems of the furnace walls. When the heat transfer in the furnace is mainly radiative, the furnace temperature can be, due to the high emissivity of the recycled exhaust gas, even slightly lower than that in the original process, and still, the heat transfer is maintained at the original level. Thus, by using the present invention, an air-fired CFB or PC boiler can be relatively easily modified for oxyfuel combustion.

According to a preferred embodiment of the present invention, the inlet gas feeding rate of a retrofitted boiler is adjusted so as to maintain the original gas velocity in the furnace. Due to the lowered temperature of the inlet gas, as compared with that of the original inlet air, the fuel feeding rate has to be increased from that of the original fuel feeding rate in order to maintain the original furnace temperature.

However, due to the higher heat capacity of the exhaust gas of the retrofitted process, having carbon dioxide as its main component, when compared to that of the exhaust gas of the original process, having nitrogen as its main component, the amount of heat carried by the exhaust gas is increased. Thereby, an increased amount of low-grade heat is available for feedwater heating in the economizers. This again leads to further saving of extracted steam, which can advantageously be expanded in auxiliary steam turbines to drive compressors and/or pumps of the power plant.

When the gas velocity in the furnace is maintained at an original level, the oxygen content of the inlet gas is advantageously near to that of air, typically, from 18% to 28%. For example, when the fuel feeding rate is increased by 17%, a recycling rate of the exhaust gas is advantageously adjusted such that the oxygen content of the inlet gas is about 24%. Correspondingly, the mass flow ratio of the inlet gas to the fuel is preferably at least 10% higher, even more preferably, at least 20% higher, than the mass flow ratio of air to fuel which is used when combusting the fuel with air.

According to an alternative embodiment of the present invention, the fuel feeding rate is adjusted to a desired level, which in a retrofitted boiler is preferably at least 10% higher, even more preferably, at least 15% higher, than in the original air-fired boiler, and the rate of feeding inlet gas to the furnace is determined so as to obtain a predetermined temperature in the furnace.

An advantage of an oxycombustion power generation process in accordance with the present invention is that it can be taken to use relatively easily by retrofitting a conventional air-fired boiler. Advantageously, the modification comprises mainly the implementation of an oxygen supply, such as a cryogenic air separation unit, and equipment for carbon dioxide sequestration, and increasing of the efficiency of the economizer system and the rate of exhaust gas recycling. As a result of these changes, a portion of the extracted steam can be used for producing mechanical energy to directly drive compressors or pumps of the power plant, causing a decrease of the loss of net power generated in the power plant.

The modified power generation process comprises advantageously a further step of decreasing the temperature of the inlet gas of the furnace and increasing of the fuel firing rate from those of the original process, so as to maintain the original furnace temperature. Thereby, the furnace and the main steam production can be maintained nearly unchanged. However, due to the increased heat capacity of the exhaust gas, even more heat can be recovered by the economizer surfaces, and even more extracted steam can be expanded in auxiliary steam generators for generating mechanical power to increase the generated net power.

The above brief description, as well as further objects, features, and advantages of the present invention will be more fully appreciated by reference to the following detailed description of the currently preferred, but nonetheless illustrative, embodiments of the present invention, taken in conjunction with the accompanying drawing.

DETAILED DESCRIPTION OF THE INVENTION

Figure 1:
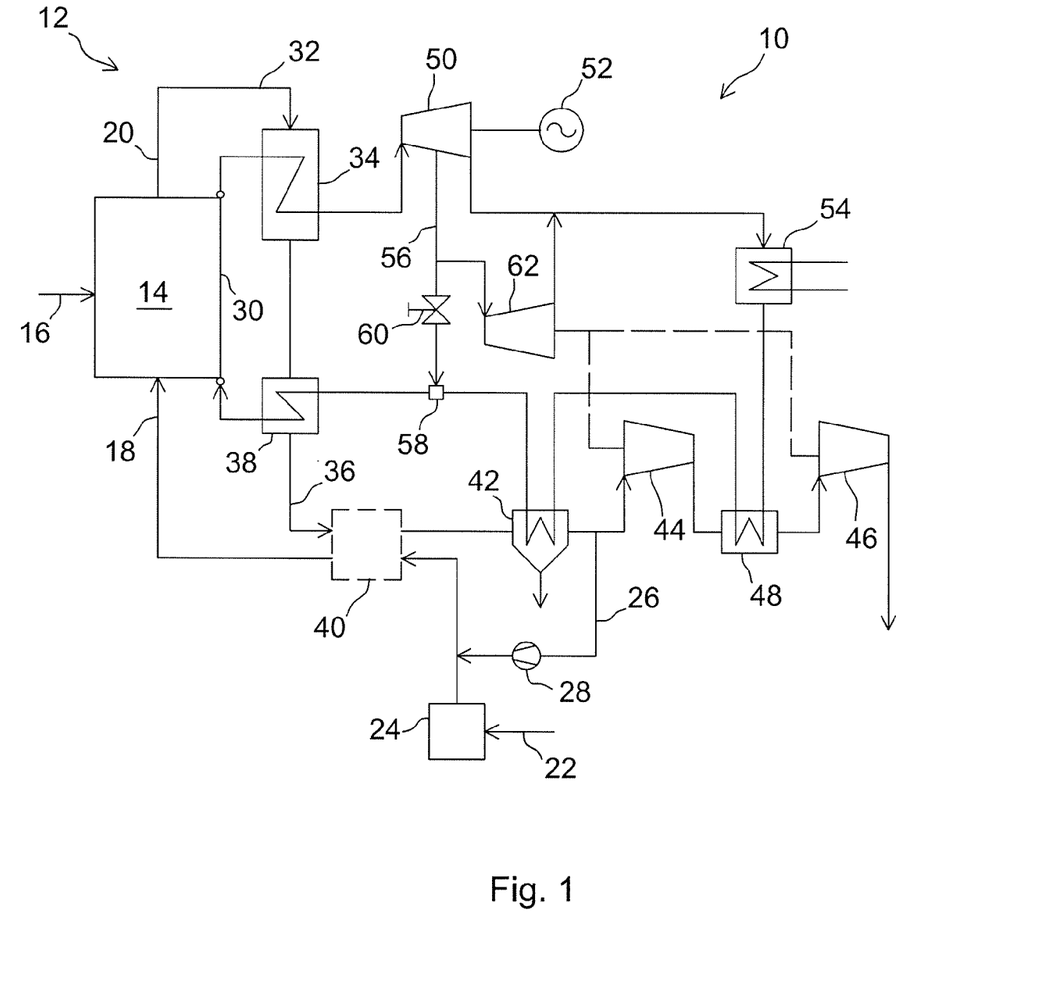
FIG. 1 is a schematic diagram of an oxyfuel-combusting power plant in accordance with the present invention.

FIG. 1 shows a schematic diagram of a power plant 10 in accordance with a preferred embodiment of the present invention. The power plant 10 comprises a boiler 12, which may be for, for example, a pulverized coal (PC) boiler or a circulating fluidized bed (CFB) boiler. The furnace 14 of the boiler comprises conventional fuel feeding means 16, means for introducing oxygen-containing inlet gas 18 into the furnace, and an exhaust gas channel 20 for discharging exhaust gas produced by combusting the fuel with the oxygen of the inlet gas. The details and type of some elements of the boiler 12, such as the fuel feeding means 16 and inlet gas feeding means 18, depend naturally on the type of the boiler. Such details, for example, burners, coal mills, means for feeding separately primary and secondary inlet gas, are, however, not important for the present invention, and they are thus not shown in FIG. 1.

The oxygen-containing inlet gas is preferably a mixture of substantially pure oxygen, produced from an air stream 22 in an air separation unit (ASU) 24, and a portion of the exhaust gas, which is recycled via an exhaust gas recycling channel 26. The exhaust gas recycling channel 26 advantageously comprises means, such as a fan 28, for controlling the exhaust gas recycling rate. The recycling rate of the inlet gas is advantageously adjusted such that the average $O_2$ content of the inlet gas is close to that of air, preferably, from 18% to 28%. In some applications of the present invention, it is also possible to introduce the streams of recycled exhaust gas and substantially pure oxygen separately into the furnace 14, for example, in different portions of the furnace.

The walls of the furnace 14 are preferably formed as a tube-wall construction, which forms an evaporating heat transfer surface 30, for converting preheated feedwater to steam. An upstream portion 32 of the exhaust gas channel 20 comprises a superheating heat transfer surface 34 for recovering so-called high-grade heat from the exhaust gas to superheat the steam. For the sake of simplicity, FIG. 1 shows only one superheating surface, but in practice, the upstream portion 32 of the exhaust gas channel usually comprises multiple superheating and reheating surfaces for recovering high-grade heat. The exhaust gas is typically cooled by the superheating and reheating surfaces to about 450° C.

Exhaust gas flowing in the downstream portion 36 of the exhaust gas channel 20, the portion downstream of the last superheater 34, still carries a considerable amount of heat, which is so-called low-grade heat. Generally, as large a portion of the low-grade heat as possible shall be recovered in order to maximize the thermal efficiency of the boiler. Thus, the downstream portion of the exhaust gas channel 20 comprises several heat transfer surfaces, of which most upstream is arranged a final economizer surface 38, wherein the feedwater is heated to its final temperature before it is fed to the evaporating surfaces 30.

Downstream of the economizer 38, there may in some applications be arranged a gas-gas heat exchanger 40, which can be of a recuperative or a regenerative type, for transferring heat from the exhaust gas to the inlet gas of the boiler 12. Such a heat exchanger may be needed, for example, for heating primary gas of a pulverized coal (PC) boiler. However, a characteristic feature of the present invention is that the efficiency of the gas-gas heat exchanger is smaller than that in a conventional utility boiler. According to a preferred embodiment of the present invention, there is no heat exchanger between the exhaust gas and the inlet gas. Especially, in a case in which the streams of recycled exhaust gas and substantially pure oxygen are fed separately into the furnace, the channel for feeding substantially pure oxygen advantageously does not comprise any gas-gas heat exchanger.

A consequence of the small amount of heating, or even missing of the heating, of the inlet gas, is that the inlet gas is fed to the furnace 14 at a relatively low temperature. Preferably, the inlet gas is fed to the furnace at an average temperature of less than 200° C., even more preferably, at an average temperature of less than 100° C. Due to the low temperature of the inlet gas, the rates of feeding fuel and oxygen, respectively, can advantageously be increased so as to produce an increased amount of heat to maintain a suitable temperature in the furnace 14.

FIG. 1 shows in the downstream portion 36 of the exhaust gas channel 20 an intermediate economizer 42, two exhaust gas compressors 44, 46 and an economizer 48 arranged between the compressors for inter-stage cooling. A characterizing feature of the present invention is that the heat transfer efficiency of the economizer (38) surfaces is higher than that in the steam cycle of a conventional utility boiler. Correspondingly, some of the economizers are located in a low temperature portion of the exhaust gas channel 20, preferably, in a location where the exhaust gas is cooled to a temperature of less than 200° C., even more preferably, in a location where the exhaust gas is cooled to a temperature of less than 100° C.

Because of the low efficiency of the gas-gas heat exchanger and the high efficiency of the economizers 38 arranged in the downstream portion 36 of the exhaust gas channel, the division of the low-grade heat to these different types of units is, according to the present invention, clearly different from that of conventional utility boilers. Preferably, more than 50%, even more preferably, more than 80%, of the recovered low-grade heat is recovered in the economizers. Correspondingly, preferably, less than 50%, even more preferably, less than 20%, of the recovered low-grade heat is recovered in a gas-gas heat exchanger.

The exhaust gas channel 20 usually comprises different units for cleaning the exhaust gas from particles and gaseous pollutants, but because they are not important for the present invention, such units are not shown in FIG. 1. In accordance with the main object of oxyfuel combustion, i.e., to recover carbon dioxide from the exhaust gas, the end portion of the exhaust gas channel is equipped with means to produce liquid carbon dioxide, typically, at a pressure of about 110 bar, so that it can be transported to further use or to be stored in a suitable place. FIG. 1 shows two exhaust gas coolers 42, 48, which are, as explained above, advantageously used as economizers, and two compressors 44, 46 for cooling and pressurizing the exhaust gas. The carbon dioxide liquefying system usually comprises, in practice, more than two cooling and compression stages, usually, at least four stages, in order to increase the efficiency of the system. In FIG. 1, the gas cooler 42 is shown as a condensing cooler, whereby water is removed from the exhaust gas. The carbon dioxide sequestration system also usually comprises means for completely drying all water from the exhaust gas, and means for separating oxygen, and possible other impurities, from the carbon dioxide, which are, however, not shown in FIG. 1. Such means for drying and means for separating are individually known in the art.

The water content of the recycled exhaust gas is advantageously lowered before the exhaust gas is recycled to the furnace. Therefore, the exhaust gas recycling line 26 is preferably branched off from the exhaust gas channel 20 downstream of the condensing cooler 42. Thereby, the water content of the recycled gas is reduced, also causing a reduction of the water content in the furnace and in the exhaust gas discharged from the furnace. Because the $O_2$ content of the exhaust gas has to be maintained at a suitable level, at about 3% by volume, in order to guarantee sufficiently complete combustion of the fuel, the reducing of the water content reduces the $O_2/CO_2$ ratio in the exhaust gas. Thus, by recycling dried exhaust gas to the furnace, the duty of separating $O_2$ from the carbon dioxide and the $O_2$ duty of the air separation unit 24 can be minimized.

The superheated steam is conducted from the superheater surfaces 34 to be expanded in a steam turbine 50 to generate power by a power generator 52. Usually, the steam turbine system of a utility boiler comprises high pressure, intermediate pressure and low pressure steam turbines, and steam reheating between the high pressure and intermediate pressure turbines. For the sake of simplicity, and because the details of the steam turbine system are not important for the present invention, FIG. 1 shows only one steam turbine.

The steam cycle of the boiler 12 comprises, in a conventional manner, a condenser 54 downstream of the steam turbine 50. The condensed steam, i.e., feedwater of the next steam cycle, is conducted from the condenser 54 for preheating in the first economizer 48, intermediate economizer 42 and final economizer 38, to be again converted to steam in the evaporation surfaces 30.

The steam turbine 50 also comprises a line 56 for extracting intermediate pressure steam from the turbine. A first portion of the extracted steam is conducted to a steam heater 58 for further preheating the feedwater. The steam cycle usually comprises, in practice, multiple steam extraction lines and multiple steam feedwater heaters, but they are not shown in FIG. 1. However, according to the present invention, due to the high efficiency of the economizers, the need for preheating feedwater by the extracted steam is minimized. Therefore, the number of steam heaters 58 is less than in conventional boilers, or the use of the steam heaters is minimized, for example, by valves 60. Advantageously, less than 50% of the preheating of the feedwater is carried out by steam heaters 54, and more than 50% by the economizers.

Because the need for using extracted steam for preheating feedwater is minimized, a portion of the extracted steam can advantageously be used for other purposes. According to the present invention, a second portion of the extracted steam is expanded in an auxiliary steam turbine 62. The steam turbine 62 converts energy of the extracted steam to mechanical energy, which can advantageously be used for directly driving compressors or pumps of the power plant. According to an advantageous embodiment of the present invention, the auxiliary steam turbine 62 is used for directly driving the exhaust gas compressors 44, 46. Alternatively, the auxiliary steam turbine 62 can be used for directly driving a compressor in the air separation unit 40.

As an example of the effect of the present invention to the efficiency of an oxyfuel power plant, a modification of a 460 MWe supercritical air-fired CFB boiler to an oxyfuel fired boiler was analyzed. By using the features of the present invention, i.e., by extending the economizer surfaces, increasing the fuel feeding rate by 17% and recycling cold and dry exhaust gas so that the oxygen content of the inlet gas was 24%, causing the gas flow to slightly increase, from 1466 m³/s to 1505 m³/s, and the bed temperature to rise from 855° C. to 900° C., the net power decrease of the plant was 11.0%, which is clearly less than the decrease of 21.4%, which was obtained by a corresponding conventional oxyfuel combustion process. According to the calculation, by using the present invention, the $CO_2$ removal rate was increased from 75.5 kg/s to 106.4 kg/s, and the loss of energy per recovered $CO_2$ was reduced from 333 kWh/$tCO_2$ to 126 kWh/$tCO_2$. At the same time, the $CO_2$ removal costs were reduced from 27.7 $/$tCO_2$ to 19.9 $/$tCO_2$, and the total cost of energy was reduced from 7.3 cents/kWh to 6.5 cents/kWh, which is quite close to 5.0 cents/kWh, i.e., that of corresponding air-fired power generation without $CO_2$ removal.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

We claim:

1. A method of generating power in a power plant by combusting carbonaceous fuel with substantially pure oxygen, the method comprising the steps of:
   (a) feeding carbonaceous fuel into a furnace;
   (b) feeding substantially pure oxygen from an oxygen supply into the furnace for combusting the fuel with the oxygen to produce exhaust gas comprising mainly carbon dioxide and water;
   (c) discharging the exhaust gas via an exhaust gas channel from the furnace;
   (d) recovering a total amount of low-grade heat from the exhaust gas by using multiple exhaust gas coolers arranged in a downstream portion of the exhaust gas channel, wherein a first portion of the recovered low-grade heat is used for preheating feedwater;
   (e) converting preheated feedwater to steam by recovering high-grade heat in heat exchange surfaces arranged in the furnace and in an upstream portion of the exhaust gas channel;
   (f) pressurizing a first portion of the exhaust gas in multiple exhaust gas compressors so as to produce liquid carbon dioxide;
   (g) recycling a second portion of the exhaust gas to the furnace via an exhaust gas recycling channel;
   (h) expanding the steam in a steam turbine system for driving a power generator;
   (i) extracting a total amount of steam from the steam turbine system, and using a first portion of the extracted steam to preheat feedwater,
   wherein the first portion of the recovered low-grade heat is more than 50% of the total amount of recovered low-grade heat allowing minimizing of the first portion of the extracted steam, and the method comprising a further step of:
   (j) expanding a second portion of the extracted steam in at least one auxiliary steam turbine for driving at least one compressor or at least one pump of the power plant.

2. The method according to claim 1, wherein the first portion of the recovered low-grade heat is more than 80% of the total amount of recovered low-grade heat.

3. The method according to claim 1, wherein the first portion of extracted steam provides less than 50% of the total heat used for preheating the feedwater.

4. The method according to claim 1, wherein the second portion of the extracted steam is at least 50% of the total amount of the extracted steam.

5. The method according to claim 1, wherein the temperature of the second portion of the exhaust gas when being fed to the furnace is lower than 200° C.

6. The method according to claim 5, wherein the temperature of the second portion of the exhaust gas when being fed to the furnace is lower than 100° C.

7. The method according to claim 1, wherein the rate of feeding the second portion of the exhaust gas to the furnace is determined so as to obtain a predetermined temperature in the furnace.

8. The method of claim 1, wherein the substantially pure oxygen is mixed with the second portion of the exhaust gas, before the oxygen and second portion of the exhaust gas are fed to the furnace, so as to form an inlet gas.

9. The method according to claim 8, wherein the mass flow ratio of the inlet gas to the fuel is at least 10% higher than the mass flow ratio of air to fuel which is used when combusting the fuel with air.

10. The method according to claim 9, wherein the mass flow ratio of the inlet gas to the fuel is at least 20% higher than the mass ratio of air to fuel which is used when combusting the fuel with air.

11. The method according to claim 8, wherein the average oxygen content, by volume, of the inlet gas is from about 18% to about 28%.

12. The method according to claim 1, wherein at least one of the multiple exhaust gas compressors is in step (j) driven by one of the auxiliary steam turbines.

13. The method according to claim 1, wherein the oxygen supply comprises an air separation unit having an air compressor, which air compressor is in step (j) driven by one of the auxiliary steam turbines.

14. The method according to claim 1, wherein at least one of the exhaust gas coolers used for preheating the feedwater is located between the exhaust gas compressors.

15. The method according to claim 1, wherein at least one of the exhaust gas coolers used for preheating the feedwater is located such that exhaust gas is cooled therein to a temperature lower than 200° C.

16. The method according to claim 14, wherein at least one of the exhaust gas coolers used for preheating the feedwater is located such that exhaust gas is cooled therein to a temperature lower than 100° C.

17. The method according to claim 1, comprising a further step of drying the second portion of the exhaust gas.

18. The method according to claim 8, wherein the method is performed free from transferring heat from the exhaust gas to the inlet gas by a gas-gas heat exchanger.

19. A power plant for generating power by combusting carbonaceous fuel with substantially pure oxygen, the power plant comprising:
a furnace for combusting the fuel;
an oxygen channel connected to the furnace for feeding the substantially pure oxygen from an oxygen supply to the furnace for combusting the fuel with the oxygen to produce exhaust gas comprising mainly carbon dioxide and water;
an exhaust gas channel connected to the furnace for discharging the exhaust gas from the furnace;
a steam cycle for converting feedwater to steam, comprising an economizer system for preheating the feedwater and heat exchange surfaces arranged in the furnace and in an upstream portion of the exhaust gas channel for recovering high-grade heat to convert preheated feedwater to steam;
multiple exhaust gas coolers arranged in a downstream portion of the exhaust gas channel for recovering a total amount of low-grade heat from the exhaust gas, wherein a portion of the exhaust gas coolers forms the economizer system;
multiple exhaust gas compressors for pressurizing a first portion of the exhaust gas so as to produce liquid carbon dioxide;
an exhaust gas recycling channel for feeding a second portion of the exhaust gas to the furnace;
a steam turbine system for expanding the steam to drive a power generator, the steam turbine system comprising means for extracting a total amount of steam;
means for using a first portion of the extracted steam to preheat feedwater,
wherein the economizer system is designed for recovering therein, in normal operation conditions, more than 50% of the total amount of low-grade heat to be recovered by the gas coolers, allowing minimizing of the first portion of the extracted steam, and the power plant further comprising:
at least one auxiliary steam turbine for expanding a second portion of the extracted steam to drive at least one compressor or at least one pump of the power plant.

20. The power plant according to claim 19, wherein the economizer system is designed for recovering therein, in normal operation conditions, more than 80% of the total amount of low-grade heat to be recovered by the gas coolers.

21. The power plant according to claim 19, wherein the means for extracting steam is designed such that the second portion of the extracted steam is, in normal operation conditions, at least 50% of the total amount of the extracted steam.

22. The power plant according to claim 19, wherein the means for extracting steam is designed such that the first portion of the extracted steam provides less than 50% of the total heat used for preheating of the feedwater.

23. The power plant according to claim 19, wherein an oxygen channel is connected to the exhaust gas recycling channel so as to feed an inlet gas consisting of the substantially pure oxygen and the second portion of the exhaust gas to the furnace.

24. The power plant according to claim 23, wherein the exhaust gas recycling channel is designed such that the temperature of the inlet gas when being fed to the furnace is, in normal operation conditions, lower than 200° C.

25. The power plant according to claim 19, wherein at least one of the multiple exhaust gas compressors is driven by one of the auxiliary steam turbines.

26. The power plant according to claim 19, wherein the oxygen supply comprises an air separation unit having an air compressor, which air compressor is driven by one of the auxiliary steam turbines.

27. The power plant according to claim 19, wherein at least one of the exhaust gas coolers of the economizer system is located between the exhaust gas compressors.

28. The power plant according to claim 19, wherein at least one of the exhaust gas coolers of the economizer system is located such that the temperature of the exhaust gas, is in normal operation conditions, cooled therein to a temperature lower than 200° C.

29. The power plant according to claim 28, wherein at least one of the exhaust gas coolers of the economizer system is located such that the temperature of the exhaust gas is, in normal operation conditions, cooled therein to a temperature lower than 100° C.

30. The power plant according to claim 23, wherein the power plant is free of a gas-gas heat exchanger for transferring heat from the exhaust gas to the inlet gas.

31. The power plant according to claim 19, wherein the power plant comprises a circulating fluidized bed boiler.

32. The power plant according to claim 19, wherein the power plant comprises a pulverized coal fired boiler.

33. A method of modifying a process of generating power by combusting carbonaceous fuel from combusting the fuel with air to combusting the fuel with substantially pure oxygen, wherein the original process comprises the steps of:
- (a) feeding carbonaceous fuel into a furnace at a first fuel feeding rate;
- (b) feeding air at a specific inlet air temperature into the furnace for combusting the fuel with the air to produce exhaust gas at a first temperature range;
- (c) discharging the exhaust gas from the furnace via an exhaust gas channel;
- (d) recovering a first total amount of low-grade heat from the exhaust gas in exhaust gas coolers arranged in a downstream portion of the exhaust gas channel, wherein a first portion of the first total amount of low grade heat is used for preheating feedwater;
- (e) converting preheated feedwater to steam by recovering high-grade heat in heat exchange surfaces arranged in the furnace and in an upstream portion of the exhaust gas channel, and
- (f) expanding the steam in a steam turbine system for driving a power generator, and extracting steam from the steam turbine system, wherein at least a portion of the extracted steam is used for preheating feedwater, to a modified process comprising the steps of:
- (a') feeding carbonaceous fuel into the furnace at a second fuel feeding rate;
- (b') feeding substantially pure oxygen from an oxygen supply into the furnace at an oxygen feeding rate for combusting the fuel with the oxygen to produce exhaust gas, comprising mainly carbon dioxide and water, at a second temperature;
- (c') discharging the exhaust gas from the furnace via the exhaust gas channel;
- (d') recovering a second total amount of low-grade heat from the exhaust gas in a modified set of exhaust gas coolers arranged in the downstream portion of the exhaust gas channel, wherein a first portion of the second total amount of low grade heat is used for preheating feedwater;
- (e') converting preheated feedwater to steam by recovering high-grade heat in the heat exchange surfaces arranged in the furnace and in the upstream portion of the exhaust gas channel;
- (f') pressurizing a portion the exhaust gas in multiple exhaust gas compressors so as to produce liquid carbon dioxide;
- (g') feeding another portion of the exhaust gas to the furnace via an exhaust gas recycling channel;
- (h') expanding the steam in a steam turbine system for driving a generator;
- (i') extracting a total amount of steam from the steam turbine system and using a first portion of the extracted steam to preheat feedwater, wherein the first portion of the second total amount of low-grade heat is larger than the first portion of the first total amount of low-grade heat, allowing minimizing of the first portion of the extracted steam, and the method comprising a further step of:
- (j') expanding a second portion of the extracted steam in at least one auxiliary steam turbine for driving at least one compressor or at least one pump of the power plant.

34. The method according to claim 33, wherein the second fuel feeding rate is at least 10% higher than the first fuel feeding rate.

35. The method according to claim 34, wherein the second fuel feeding rate is at least 15% higher than the first fuel feeding rate.

36. The method according to claim 33, wherein the first portion of the second total amount of low-grade heat is more than 50% of the second total amount of low-grade heat.

37. The method according to claim 33, wherein the first portion of the second total amount of low-grade heat is more than 80% of the second total amount of low-grade heat.

38. The method according to claim 33, wherein the first portion of the extracted steam is at least 30% less than the portion of extracted steam which is in step (f) of the original process used for preheating feedwater.

39. The method according to claim 33, wherein the second portion of the extracted steam is at least 50% of the total amount of the extracted steam.

40. The method according to claim 33, wherein the first portion of the extracted steam provides less than 50% of the total heat used for preheating the feedwater.

41. The method according to claim 33, wherein the temperature of the second portion of the exhaust gas when being fed to the furnace is lower than the specific inlet air temperature.

42. The method according to claim 41, wherein the temperature of the second portion of the exhaust gas when being fed to the furnace is lower than 200° C.

43. The method according to claim 42, wherein the temperature of the second portion of the exhaust gas when being fed to the furnace is lower than 100° C.

44. The method according to claim 33, wherein the rate of feeding the second portion of the exhaust gas to the furnace is determined so as to obtain a predetermined temperature in the furnace.

45. The method according to claim 44, wherein the rate of feeding the second portion of the exhaust gas to the furnace is determined so that the second temperature range is approximately the same as the first temperature range.

46. The method of claim 33, wherein, in the modified process, the substantially pure oxygen is mixed with the second portion of the exhaust gas, before the oxygen and the second portion of the exhaust gas are fed to the furnace, so as to form an inlet gas.

47. The method according to claim 46, wherein the mass flow ratio of the inlet gas to the fuel is at least 10% higher than the mass flow ratio of air to fuel which is used in the original process.

48. The method according to claim 47, wherein the mass flow ratio of the inlet gas to the fuel is at least 20% higher than the mass flow ratio of air to fuel which is used in the original process.

49. The method according to claim 46, wherein the average oxygen content, by volume, of the inlet gas is from about 18% to about 28%.

50. The method according to claim 33, wherein at least one of the multiple exhaust gas compressors is in step (j') driven by one of the auxiliary steam turbines.

51. The method according to claim 33, wherein the oxygen supply comprises an air separation unit having an air compressor, which air compressor is in step (j') driven by one of the auxiliary steam turbines.

52. The method according to claim 33, wherein at least one of the exhaust gas coolers used for preheating the feedwater is located between the exhaust gas compressors.

53. The method according to claim 33, wherein at least one of the exhaust gas coolers used for preheating the feedwater is located such that exhaust gas is cooled therein to a temperature lower than 200° C.

54. The method according to claim 53, wherein at least one of the exhaust gas coolers used for preheating the feedwater is located such that exhaust gas is cooled therein to a temperature lower than 100° C.

55. The method according to claim 33, comprising a further step of drying the second portion of the exhaust gas.

56. The method according to claim 46, wherein the method is performed free of transferring heat from the exhaust gas to the inlet gas by a gas-gas heat exchanger.

* * * * *